United States Patent
Aaron et al.

(10) Patent No.: US 10,764,113 B2
(45) Date of Patent: Sep. 1, 2020

(54) SELF-ADJUSTING CONTROL LOOP

(71) Applicant: AT&T Intellectual Property I, L.P., Atlanta, GA (US)

(72) Inventors: Jeffrey Aaron, Brookhaven, GA (US); James Fan, San Ramon, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 88 days.

(21) Appl. No.: 16/028,227

(22) Filed: Jul. 5, 2018

(65) Prior Publication Data

US 2020/0014581 A1    Jan. 9, 2020

(51) Int. Cl.
| | |
|---|---|
| H04L 12/24 | (2006.01) |
| H04L 12/64 | (2006.01) |
| H04L 12/801 | (2013.01) |
| H04L 12/28 | (2006.01) |
| H04L 12/873 | (2013.01) |
| G06F 8/65 | (2018.01) |
| G06N 20/00 | (2019.01) |

(52) U.S. Cl.
CPC ............ *H04L 41/046* (2013.01); *H04L 12/28* (2013.01); *H04L 12/6418* (2013.01); *H04L 41/0893* (2013.01); *H04L 41/16* (2013.01); *H04L 41/50* (2013.01); *H04L 47/11* (2013.01); *H04L 47/12* (2013.01); *H04L 47/528* (2013.01); *G06F 8/65* (2013.01); *G06N 20/00* (2019.01)

(58) Field of Classification Search
CPC ..... H04L 12/28; H04L 12/6418; H04L 47/11; H04L 47/12; H04L 47/528
See application file for complete search history.

(56) References Cited

U.S. PATENT DOCUMENTS

| | | | |
|---|---|---|---|
| 8,340,790 B2 * | 12/2012 | Law | ...................... G05B 19/418 |
| | | | 327/155 |
| 9,825,833 B2 | 11/2017 | Amulothu et al. | |
| 2003/0236882 A1 * | 12/2003 | Yan | ........................... G06F 8/00 |
| | | | 709/225 |

(Continued)

FOREIGN PATENT DOCUMENTS

| | | |
|---|---|---|
| WO | 2016180968 A1 | 11/2016 |
| WO | 2017209671 A1 | 12/2017 |

(Continued)

*Primary Examiner* — Lashonda T Jacobs
(74) *Attorney, Agent, or Firm* — Baker Botts, LLP (57) ABSTRACT

In one embodiment, a method includes monitoring, by a control loop including a processor and a memory, a first environment. The control loop includes one or more predetermined control loop parameters. The method also includes receiving, by the control loop and in response to monitoring the first environment, first data from the first environment and receiving, by the control loop, information from an adaptation control loop. The method also includes determining, by the control loop, to automatically adjust at least one of the one or more predetermined control loop parameters based at least in part on the information received from the adaptation control loop and automatically adjusting, by the control loop, the one or more predetermined control loop parameters. The method further includes determining, by the control loop, to initiate an action based on the first data collected from the first environment and the one or more adjusted control loop parameters.

20 Claims, 5 Drawing Sheets

(56) References Cited

U.S. PATENT DOCUMENTS

| | | | |
|---|---|---|---|
| 2009/0238070 A1* | 9/2009 | Rivers | H04L 47/263 370/235 |
| 2010/0057223 A1* | 3/2010 | Kelly | G05B 21/02 700/33 |
| 2012/0284009 A1* | 11/2012 | De Florio | G06F 8/24 703/22 |
| 2013/0080361 A1* | 3/2013 | Sterritt | G05B 13/02 706/14 |
| 2015/0074749 A1* | 3/2015 | Vasko | G05B 19/4185 726/1 |
| 2015/0113133 A1* | 4/2015 | Srinivas | H04L 41/145 709/224 |
| 2015/0358248 A1* | 12/2015 | Saha | H04L 47/12 709/226 |
| 2016/0062746 A1* | 3/2016 | Chiosi | H04L 41/145 717/104 |
| 2016/0085576 A1* | 3/2016 | Chastain | G06F 9/45558 718/1 |
| 2016/0124781 A1* | 5/2016 | Chastain | H04L 41/0893 719/313 |
| 2016/0127478 A1* | 5/2016 | Chastain | H04L 67/16 709/223 |
| 2016/0149774 A1* | 5/2016 | Chastain | H04L 43/028 370/241 |
| 2016/0211988 A1* | 7/2016 | Lucas | H04L 45/22 |
| 2016/0266938 A1* | 9/2016 | Suzuki | G06F 9/54 |
| 2016/0359902 A1 | 12/2016 | Petrilak et al. | |
| 2016/0373510 A1 | 12/2016 | Sreevalsan et al. | |
| 2017/0063599 A1* | 3/2017 | Wu | H04L 41/5035 |
| 2017/0102694 A1 | 4/2017 | Enver et al. | |
| 2017/0104609 A1* | 4/2017 | McNamee | H04M 15/61 |
| 2017/0280350 A1 | 9/2017 | Skaaksrud | |
| 2017/0295082 A1* | 10/2017 | Wu | H04L 67/10 |
| 2017/0331899 A1 | 11/2017 | Binder et al. | |
| 2018/0018203 A1 | 1/2018 | Khasnabish | |
| 2018/0026895 A1 | 1/2018 | Wang et al. | |
| 2018/0049101 A1 | 2/2018 | Dacosta | |
| 2018/0054360 A1 | 2/2018 | Htay | |
| 2018/0278485 A1* | 9/2018 | Lugones | G06F 9/45533 |
| 2018/0314549 A1* | 11/2018 | Chokkalingam | H04L 41/5051 |
| 2019/0079804 A1* | 3/2019 | Thyagarajan | G06F 9/45533 |
| 2019/0149396 A1* | 5/2019 | Zafer | H04L 41/0609 709/224 |
| 2020/0044921 A1* | 2/2020 | Srinivas | H04L 41/0823 |

FOREIGN PATENT DOCUMENTS

| | | |
|---|---|---|
| WO | 2017222435 A1 | 12/2017 |
| WO | 2018028763 A1 | 2/2018 |
| WO | 2018060170 A1 | 4/2018 |

\* cited by examiner

SELF-ADJUSTING CONTROL LOOP

TECHNICAL FIELD

This disclosure generally relates to a control loop, and more specifically to a self-adjusting control loop.

BACKGROUND

Control loops are used to measure and adjust a variable that controls an individual process. For example, a control loop may measure and adjust a given variable of a network-based service. Control loops use policies that are configured to determine their behavior. These policies can be changed by human operators, but they are otherwise static.

SUMMARY OF PARTICULAR EMBODIMENTS

According to an embodiment, a method includes monitoring, by a control loop including a processor and a memory, a first environment. The control loop includes one or more predetermined control loop parameters. The method also includes receiving, by the control loop and in response to monitoring the first environment, first data from the first environment and receiving, by the control loop, information from an adaptation control loop. The information is based on one or more predetermined adaptation policies of the adaptation control loop and second data received by the adaption control loop from a second environment. The method also includes determining, by the control loop, to automatically adjust at least one of the one or more predetermined control loop parameters based at least in part on the information received from the adaptation control loop. The method further includes automatically adjusting, by the control loop, the one or more predetermined control loop parameters and determining, by the control loop, to initiate an action based on the first data collected from the first environment and the one or more adjusted control loop parameters.

According to another embodiment, one or more computer-readable non-transitory storage media embodies software that is executable to monitor, by a control loop including a processor and a memory, a first environment. The control loop includes one or more predetermined control loop parameters. The software is further executable to receive, by the control loop and in response to monitoring the first environment, first data from the first environment and receive, by the control loop, information from an adaptation control loop. The information is based on one or more predetermined adaptation policies of the adaptation control loop and second data received by the adaption control loop from a second environment. The software is further executable to determine, by the control loop, to automatically adjust at least one of the one or more predetermined control loop parameters based at least in part on the information received from the adaptation control loop. The software is further executable to automatically adjust, by the control loop, the one or more predetermined control loop parameters and determine, by the control loop, to initiate an action based on the first data collected from the first environment and the one or more adjusted control loop parameters.

According to yet another embodiment, a system includes one or more processors and a memory coupled to the processors comprising instructions executable by the processors to monitor, by a control loop, a first environment. The control loop includes one or more predetermined control loop parameters. The instructions are further executable to receive, by the control loop and in response to monitoring the first environment, first data from the first environment and receive, by the control loop, information from an adaptation control loop. The information is based on one or more predetermined adaptation policies of the adaptation control loop and second data received by the adaption control loop from a second environment. The instructions are further executable to determine, by the control loop, to automatically adjust at least one of the one or more predetermined control loop parameters based at least in part on the information received from the adaptation control loop. The instructions are further executable to automatically adjust, by the control loop, the one or more predetermined control loop parameters and determine, by the control loop, to initiate an action based on the first data collected from the first environment and the one or more adjusted control loop parameters.

A technical advantage of this disclosure is providing the capability to self-adjust a basic control loop's behavior through a high-level adaptation (e.g., external monitoring, analysis, decision making, and adjustment) structure without redesigning the control loop. Another technical advantage includes the ability of the control loop to adapt itself to changes in its environment, which avoids nonsensical behavior and enhances the safety of a basic control loop. As another technical advantage, a self-adjusting control loop increases the certainty that the control loop is performing its intended function. Providing the ability to self-adjust a control loop enhances the ease and speed of practical control loop design since control loop designers can accept a much simpler basic design when taking advantage of the adaptive self-adjustment capability. The normal concerns of the control loop designers to understand the operating environment of the control loop are considerably reduced, which also improves time-to-market for control loop automation.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DESCRIPTION OF EXAMPLE EMBODIMENTS

A basic control loop is a single unit of automation that may include collecting data, analyzing the data, determining an action to be taken based on the analysis, and taking that action to effect a change external to the control loop. An adaptive self-adjusting control loop is a control loop that can monitor an environment external to itself. The self-adjusting control loop may analyze environmental changes, decide what self-adjustments would be beneficial, and then perform those self-adjustments.

Control loops such as those found in Open Network Automation Platform (ONAP) use policies that are configured to determine their behavior. These policies can be changed by human operators when desired, but they are otherwise static. For example, a control loop may monitor a router of a virtual network function (VNF). The control loop may determine, based on predetermined policies, that the router is heavily loaded. In the event the router is heavily loaded, the control loop may initiate an action to shut down the router, which may negatively affect operation of other components of the VNF environment. Human operators can manually change and/or update the predetermined policies, but this process is labor, cost, and time intensive.

Rather than human operators deciding to change and/or update existing control loop policies, a self-adjusting control loop can react to changing conditions by updating its own behavior as needed. Conditions monitored may include global conditions, local conditions, messages or events, and internal operating conditions. The self-adjusting control loop may monitor any specified conditions and adjust its own policies to modify its own behavior. The self-adjusting control loop may use special pre-specified adaptation policies to determine actions to take to modify its own behavior. Actions that can be specified in such adaptation policies may include changing a named control loop policy set to another named control loop policy set, changing control loop policy parameters or values (e.g., a threshold), and requesting analysis to determine what changes to make.

Figure 1A:
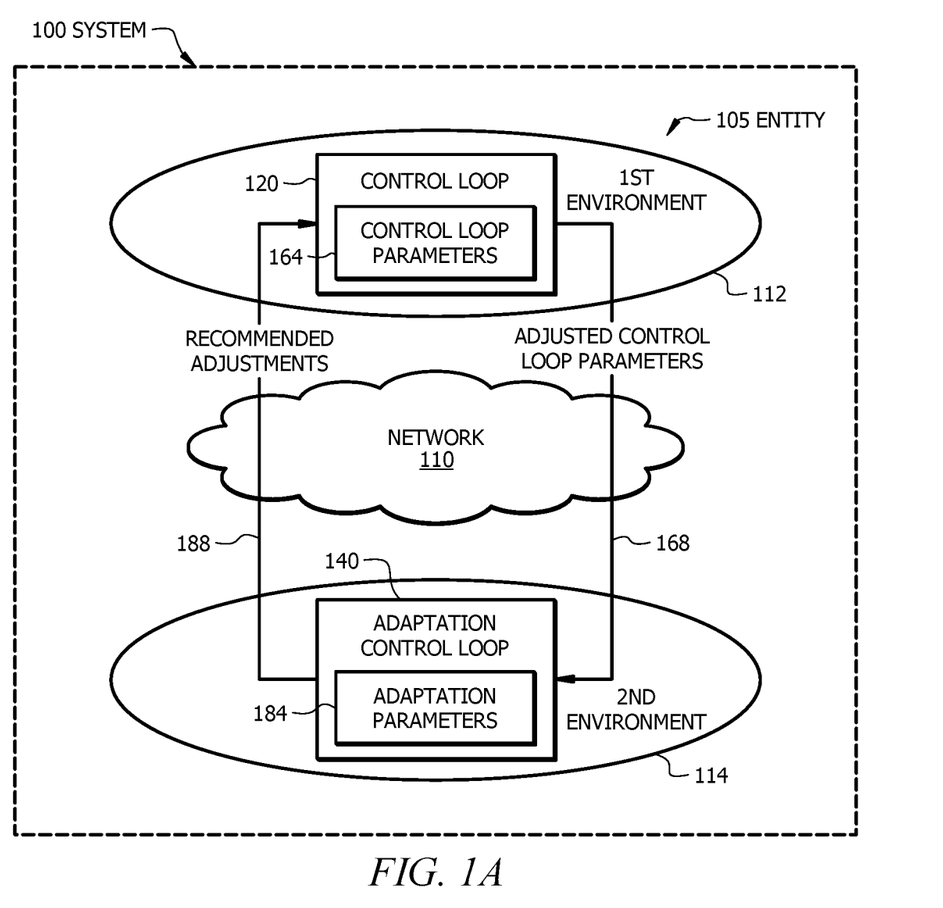
FIG. 1A illustrates an example system for adjusting a control loop.
Figure 1B:
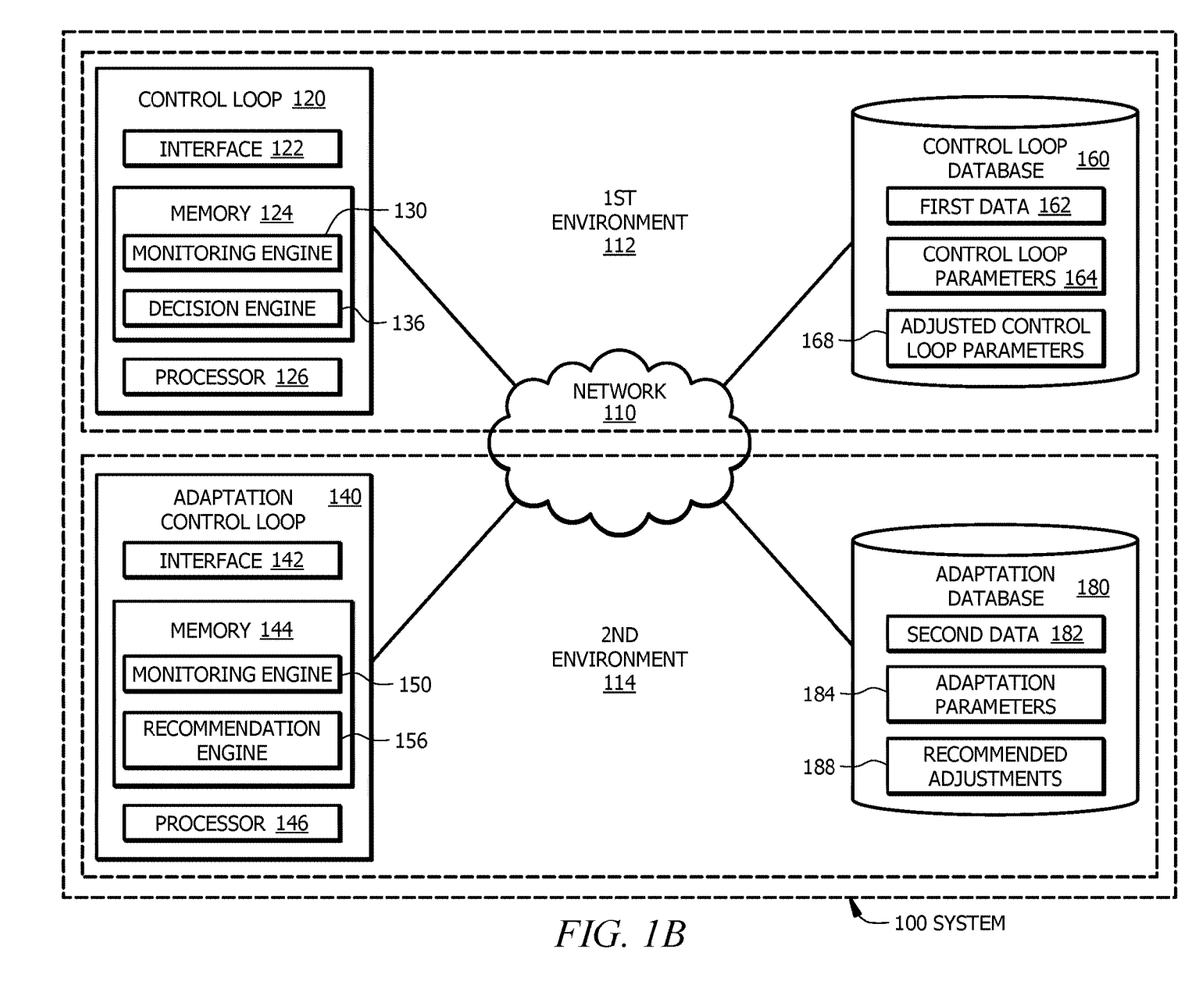
FIG. 1B illustrates additional details of the system of FIG. 1A.
Figure 2:
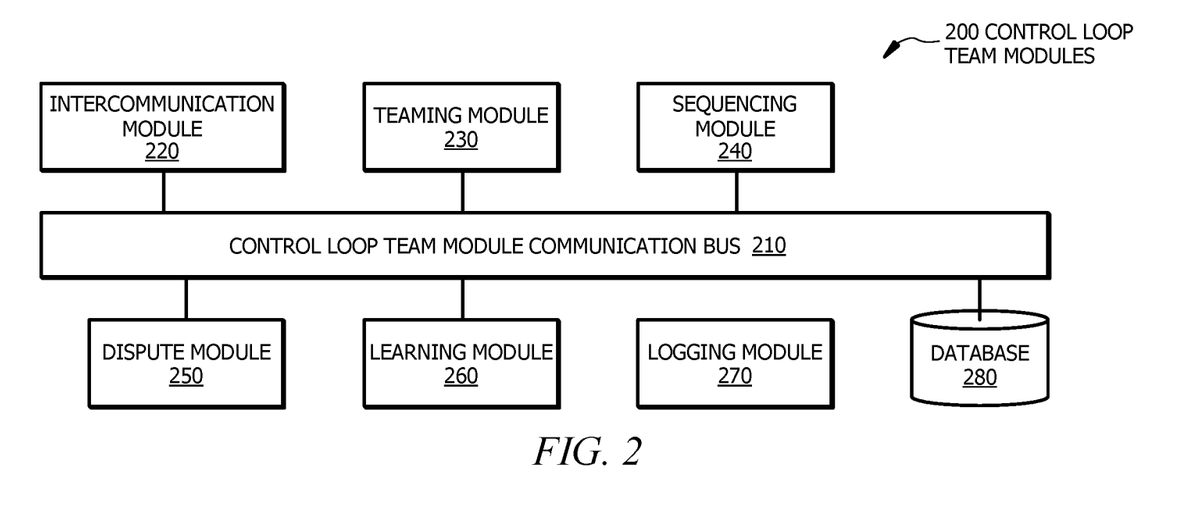
FIG. 2 illustrates example control loop team modules that may be used by the system of FIGS. 1A and 1B.
Figure 3:
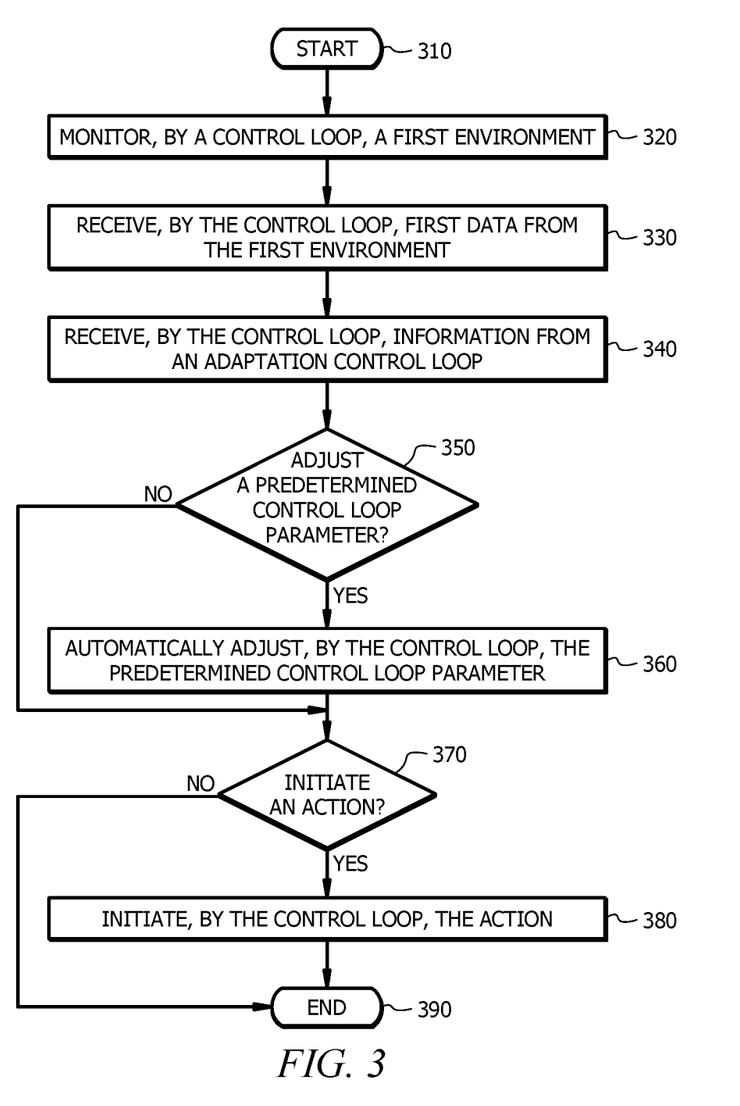
FIG. 3 illustrates an example method for adjusting a control loop.
Figure 4:
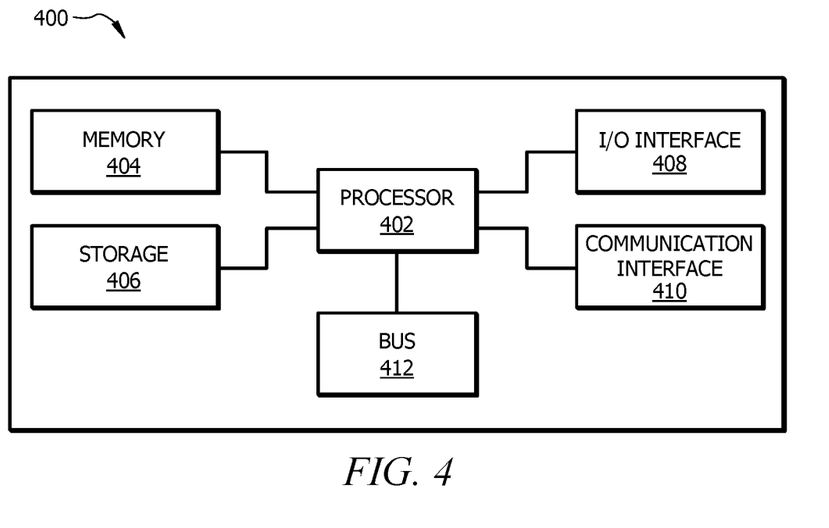
FIG. 4 illustrates an example computer system that may be used by the systems and methods described herein.

FIGS. 1A through 4 show example systems and methods for adjusting a control loop. In particular, FIG. 1A shows an example system for adjusting a control loop and FIG. 1B shows additional details of the system of FIG. 1A. FIG. 2 shows control loop team modules that may be used by the system of FIGS. 1A and 1B. FIG. 3 shows an example method for adjusting a control loop. FIG. 4 shows an example computer system that may be used by the systems and methods described herein.

FIG. 1A illustrates an example system 100 for adjusting a control loop. System 100 of FIG. 1A includes a network 110, a first environment 112, a second environment 114, a control loop 120, an adaptation control loop 140, control loop parameters 164, adjusted control loop parameters 168, adaptation parameters 184, and recommended adjustments 188. Network 110, first environment 112, second environment 114, control loop 120, adaptation control loop 140, control loop parameters 164, adjusted control loop parameters 168, adaptation parameters 184, and recommended adjustments 188 may be associated with an entity 105. Network 110 may be a private network that connects components of entity 105.

Control loop 120 is a segment of a process control system. Physical components of control loop 120 (e.g., a controller) may automatically control a process. Control loop 120 may be a single unit of automation that includes data collection, analysis of the data, determination of an action to be taken based on the analysis, and initiation of that action. Control loop 120 monitors first environment 112. Control loop 120 may collect data from first environment 112, analyze the data collected from first environment 112 based on one or more control loop parameters 164, determine an action to be taken based on the analysis of the data collected from first environment 112, and initiate the determined action. First environment 112 may be a server hosted by a cloud computing platform, and control loop parameters 164 may be policies associated with the operation of the server hosted by the cloud computing platform. Control loop 120 may receive recommended adjustments 188 for control loop parameters 164 from adaptation control loop 140 and adjust control loop parameters 164 to create adjusted control loop parameters 168.

Adaptation control loop 140 monitors an environment external to the environment monitored by control loop 120. Physical components of adaptation control loop 140 (e.g., a controller) may automatically control a process. Adaptation control loop 140 may monitor second environment 114, collect data from second environment 114, analyze the data collected from second environment 114 based on one or more adaptation parameters 184, and recommend adjustments 188 to be made to control loop 120 based on the analysis of the data collected from second environment 114. Second environment 114 may be the security of a cloud computing platform that hosts a server of first environment 112, and adaption parameters 184 may be policies associated with the security of the cloud computing platform. Adaptation control loop 140 may be deactivated at any time for any period of time.

In operation, control loop 120 monitors first environment 112, such as a server of a cloud computing platform, based on one or more control loop parameters 164 (e.g., policies associated with the operation of the server hosted by the cloud computing platform). Control loop 120 sends control loop parameters 164 to adaptation control loop 140. Adaptation control loop 140 monitors second environment 114, such as the security of the cloud computing platform that hosts the server, collects data from second environment 114, and analyzes the collected data based on one or more adaptation parameters 184 (e.g., policies associated with the security of the cloud computing platform). Adaptation control loop 140 makes decisions regarding self-adjustment actions to be taken by control loop 120 and sends recommended adjustments 188 to control loop 120. Control loop 120 then determines whether to automatically adjust control loop parameters 164 based on recommended adjustments 188 received from adaptation control loop 140. In the event control loop 120 determines to automatically adjust control loop parameters 164, control loop 120 collects data from first environment 112, analyzes the collected data, and initiates one or more actions based at least in part on adjusted control loop parameters 168.

As such, system 100 of FIG. 1A automatically self-adjusts a control loop, which may allow the otherwise static control loop to better react to changes in overall conditions.

FIG. 1B illustrates additional details of system 100 of FIG. 1A. System 100 of FIG. 1B includes control loop 120, adaptation control loop 140, a control loop database 160, and an adaptation database 180, which are connected by network 110. Control loop 120 and control loop database 160 are included in first environment 112 and adaptation control loop 140 and adaptation database 180 are included in second environment 114. Second environment 114 may be external to and separate from first environment 112.

First environment 112 is any environment that can be monitored by control loop 120. First environment may be a component of a VNF, such as a server or router. Second environment 114 is any environment that can be monitored by adaptation control loop 140. Second environment 114 may be a service provided by a VNF, such as a security service. Second environment 114 may engulf first environment 112. For example, second environment 114 may be a cloud environment, and first environment 112 may be a server that is a component of the cloud environment.

Control loop 120 may be a slave to adaptation control loop 140 such that the decisions made by adaptation control loop 140 control over the decisions made by control loop 120. Control loop 120 may be a master to adaptation control loop 140 such that the decisions made by control loop 120 control over the decisions made by adaptation control loop 140. Control loop 120 may include adaptation control loop 140 such that control loop 120 and adaptation control loop 140 are considered a single control loop.

Control loop 120 includes an interface 122, a memory 124, and a processor 126, which may be components of computer system 400 of FIG. 4. Memory 124 includes a monitoring engine 130 and a decision engine 136. Adaptation control loop 140 includes an interface 142, a memory 144, and a processor 146, which may be components of computer system 400. Memory 144 includes a monitoring engine 150 and a recommendation engine 156. Control loop database 160 includes first data 162, control loop parameters 164, and adjusted control loop parameters 168. Adaptation database 180 includes second data 182, adaptation parameters 184, and recommended adjustments 188. As discussed above, system 100 or portions thereof may be associated with entity 105, which may include any entity, such as a business or company, that uses control loops. The elements of system 100 may be implemented using any suitable combination of hardware, firmware, and software.

Network 110 of system 100 is private network that connects components of entity 105. Although this disclosure shows network 110 as being a particular kind of network, this disclosure contemplates any suitable network. One or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. For example, control loop 120 may communicate over network 110, including receiving data from adaptation control loop 140, control loop database 160, and/or adaptation database 180.

Interface 122 of control loop 120 represents any suitable computer element that can receive information from network 110, transmit information through network 110, perform suitable processing of the information, communicate to other components (e.g., adaptation control loop 140) of system 100, or any combination of the preceding. Interface 122 may receive recommended adjustments 188 from adaptation database 180 via network 110, for example. Interface 122 may transmit adjusted control loop parameters 168 to control loop database 160, as another example. Interface 122 represents any port or connection, real or virtual, including any suitable combination of hardware, firmware, and software, including protocol conversion and data processing capabilities, to communicate through an LAN, a WAN, or other communication system that allows entity 105 associated with system 100 to exchange information between components of system 100.

Memory 124 of control loop 120 stores, permanently and/or temporarily, received and transmitted information, as well as system software, control software, other software for control loop 120, and a variety of other information. Memory 124 may store information for execution by processor 126. Memory 124 stores monitoring engine 130 and decision engine 136 of control loop 120. Control loop 120 may store one or more databases (e.g., control loop database 160). Memory 124 includes any one or a combination of volatile or non-volatile local or remote devices suitable for storing information. Memory 124 may include Random Access Memory (RAM), Read-only Memory (ROM), magnetic storage devices, optical storage devices, or any other suitable information storage device or a combination of these devices. Memory 124 may include any suitable information for use in the operation of control loop 120. Additionally, memory 124 may be a component external to (or may be partially external to) control loop 120. Memory 124 may be located at any location suitable for memory 124 to communicate with control loop 120.

Processor 126 of control loop 120 controls certain operations of control loop 120 by processing information received from interface 122 and memory 124 or otherwise accessed by processor 126. Processor 126 communicatively couples to interface 122 and memory 124. Processor 126 may include any hardware and/or software that operates to control and process information. Processor 126 may be a programmable logic device, a microcontroller, a microprocessor, any suitable processing device, or any suitable combination of the preceding. Additionally, processor 126 may be a component external to control loop 120. Processor 126 may be located in any location suitable for processor 126 to communicate with control loop 120. Processor 126 controls the operation of monitoring engine 130 and decision engine 136.

Monitoring engine 130 of control loop 120 is a computer program that monitors first environment 112. Monitoring engine 130 may receive control loop parameters 164 (e.g., policies) from control loop database 160 and monitor first environment 112 based on control loop parameters 164. Monitoring engine 130 collects first data 162 from first environment 112. Control loop parameters 164 received by monitoring engine 130 may include policies for data collection, such as what data should be collected by monitoring engine 130 and how often monitoring engine 130 should collect data, and monitoring engine 130 may collect first data 162 based on these data collection policies. Monitoring engine 130 analyzes first data 162 collected from first environment 112. Control loop parameters 164 received by monitoring engine 130 may include policies for data analysis, such as what type of analysis to perform and at what depth the analysis should be performed, and monitoring engine 130 may analyze first data 162 based on these data analysis policies.

Decision engine 136 of control loop 120 is a computer program that makes decisions for control loop 120. Decision engine 136 may make decisions based on the data analysis performed by monitoring engine 130. Decision engine 136 may determine what action control loop 120 will take based on the data analysis. Decision engine 136 may then take the determined action. Actions taken by decision engine 136 may include sending a message to a management system, recommending a remedial measure, or installing a software patch to a software program associated with first environment 112.

Decision engine 136 of control loop 120 may make decisions based on information received from adaptation control loop 140. Decision engine 136 may receive one or more recommended adjustments 188 from adaptation control loop 140 and adjust one or more control loop parameters 164 based on recommended adjustments 188. Decision engine 136 may then transmit adjusted control loop parameters 168 to monitoring engine 130 so that monitoring engine 130 can recommend adjustments to the adjusted control loop parameters 168.

Interface 142 of adaptation control loop 140 represents any suitable computer element that can receive information from network 110, transmit information through network 110, perform suitable processing of the information, communicate to other components (e.g., adaptation database 180) of system 100, or any combination of the preceding. Interface 142 may receive second data 182 from second environment 114 via network 110. Interface 142 may transmit second data 182 to adaptation database 180 via network 110. Interface 142 represents any port or connection, real or virtual, including any suitable combination of hardware, firmware, and software, including protocol conversion and data processing capabilities, to communicate through a LAN, a WAN, or other communication system that allows the entity associated with system 100 to exchange information between components of system 100.

Memory 144 of adaptation control loop 140 stores, permanently and/or temporarily, received and transmitted information, as well as system software, control software, other software for adaptation control loop 140, and a variety of other information. Memory 144 may store information for execution by processor 146. Memory 144 stores monitoring engine 150 and recommendation engine 156.

Memory 144 includes any one or a combination of volatile or non-volatile local or remote devices suitable for storing information. Memory 144 may include RAM, ROM, magnetic storage devices, optical storage devices, or any other suitable information storage device or a combination of these devices. Memory 144 may include any suitable information for use in the operation of adaptation control loop 140. Additionally, memory 144 may be a component external to (or may be partially external to) adaptation control loop 140. Memory 144 may be located at any location suitable for memory 144 to communicate with adaptation control loop 140.

Processor 146 of adaptation control loop 140 controls certain operations of adaptation control loop 140 by processing information received from interface 142 and memory 144 or otherwise accessed by processor 146. Processor 146 communicatively couples to interface 142 and memory 144. Processor 146 includes any hardware and/or software that operates to control and process information. Processor 146 may be a programmable logic device, a microcontroller, a microprocessor, any suitable processing device, or any suitable combination of the preceding. Additionally, processor 146 may be a component external to adaptation control loop 140. Processor 146 may be located in any location suitable for processor 146 to communicate with adaptation control loop 140. Processor 146 controls the operation of monitoring engine 150 and recommendation engine 156.

Monitoring engine 150 of adaptation control loop 140 is a computer program that monitors second environment 114. Monitoring engine 150 may receive adaptation control loop parameters 184 (e.g., policies) from adaptation database 180 and monitor second environment 114 based on adaptation parameters 184. Monitoring engine 150 may monitor second environment 114 using a microservice, a neural network, artificial intelligence (AI), and/or machine learning (ML).

Monitoring engine 150 collects second data 182 from second environment 114. Adaptation parameters 184 received by monitoring engine 150 may include policies for data collection, such as what data should be collected by monitoring engine 150 and how often monitoring engine 150 should collect data, and monitoring engine 150 may collect second data 182 based on these data collection policies. Monitoring engine 150 analyzes second data 182 collected from second environment 114. Adaptation parameters 184 received by monitoring engine 150 may include policies for data analysis, such as what type of analysis to perform and at what depth the analysis should be performed, and monitoring engine 150 may analyze second data 182 based on these data analysis policies.

Recommendation engine 156 of adaptation control loop 140 is a computer program that recommends adjustments 188 to be made to control loop parameters 164 of control loop 120. Recommendation engine 156 may receive analyzed second data 182 from monitoring engine 150 and recommend adjustments 188 based on the received analyzed second data 182. Recommendation engine 156 may determine recommended adjustments 188 based on the received analyzed second data 182. Recommendation engine 156 may determine recommended adjustments 188 based on state or history data of adaptation control loop 140. Recommendation engine 156 may transmit one or more recommended adjustments 188 to control loop 120.

Control loop database 160 is any database that can store data associated with system 100. Control loop database 160 may store certain types of information for entity 105. Control loop database 160 may be a single database or may include multiple databases. Control loop database 160 stores first data 162, control loop parameters 164, and adjusted control loop parameters 168. Control loop database 160 may also store information that may be used by control loop 120 to determine current and/or future control loop decisions. This information may include state or history data (e.g., past action decisions of control loop 120).

First data 162 of control loop database 160 includes any data received by control loop 120 from first environment 112. First data 162 may be collected from first environment 112 in accordance with one or more control loop parameters 164, such as data collection policies. First data 162 may be collected in real-time (e.g., within milliseconds) so that it is immediately available for analysis by monitoring engine 130. First data 162 may be collected in accordance with a temporal frequency (e.g., every second, minute, hour, or day). First data 162 may be event data or performance data received from first environment 112 (e.g., a VNF router). Control loop parameters 164 of control loop database 160 are any predetermined parameters that may be used by monitoring engine 130 and decision engine 136. Control loop parameters 164 may include one or more policies (e.g., data collection policies and/or data analysis policies), one or more policy sets (e.g., a policy set for an orchestrator and a policy set for a controller), one or more code portions (e.g., a data collection code portion), and one or more threshold values (e.g., a maximum load capacity for a server). Adjusted control loop parameters 168 are control loop parameters 164 that have been adjusted in accordance with recommended adjustments 188 received from adaptation control loop 140. Adjusted control loop parameters 168 may be created by adding at least one new parameter to control loop parameters 164, deleting at least one of the one or more control loop parameters 164, or replacing at least one control loop parameter 164 with an alternate parameter.

Control loop database 160 includes any one or a combination of volatile or non-volatile local or remote devices suitable for storing information. Control loop database 160 may include RAM, ROM, magnetic storage devices, optical storage devices, or any other suitable information storage device or a combination of these devices. Although control loop database 160 is shown separate from control loop 120, adaptation control loop 140, and adaptation database 180 in FIG. 1B, control loop database 160 may be located in any location suitable for communication with control loop 120, adaptation control loop 140, and adaptation database 180. Control loop database 160 may be externally located from system 100. Control loop database 160 may be located in control loop 120, adaptation control loop 140, or adaptation database 180. Although described as a database, control loop database 160 may be implemented as any suitable type of volatile or non-volatile memory. Control loop database 160 may include one or more interfaces and/or processor.

Adaptation database 180 is any database that can store data associated with system 100. Adaptation database 180 may store certain types of information for entity 105. Adaptation database 180 may be a single database or may include multiple databases. Adaptation database 180 stores second data 182, adaptation parameters 184, and recommended adjustments 188. Adaptation database 180 may also store information that may be used by adaptation control loop 140 to determine current and/or future control loop decisions. This information may include state or history data (e.g., past action decisions of adaptation control loop 140).

Second data 182 includes any data received by adaptation control loop 140 from second environment 114. Second data 182 may be collected from second environment 114 in accordance with one or more adaptation parameters 184, such as data collection policies. Second data 182 may be collected in real-time (e.g., within milliseconds) so that it is immediately available for analysis by recommendation engine 150. Second data 182 may be collected in accordance with a temporal frequency (e.g., every second, minute, hour, or day). Second data 182 may be an internal operation condition, personal information, operating costs, or security information received from second environment 114 (e.g., a virtual cloud service for an entity). Adaptation parameters 184 of adaptation database 180 are any predetermined parameters that may be used by monitoring engine 150 and recommendation engine 156. Adaptation parameters 184 may include one or more policies (e.g., data collection policies and/or data analysis policies), one or more policy sets (e.g., a policy set for an orchestrator and a policy set for a controller), one or more code portions (e.g., a data collection code portion), and one or more threshold values (e.g., a maximum operational cost for a VNF). Recommended adjustments 188 are adjustments to control loop parameters 164 that have been determined by recommendation engine 156 of adaptation control loop 140. Recommended adjustments 188 may include recommendations to add at least one new parameter to control loop parameters 164, delete at least one of the one or more control loop parameters 164, or replace at least one control loop parameter 164 with an alternate parameter.

Adaptation database 180 includes any one or a combination of volatile or non-volatile local or remote devices suitable for storing information. Adaptation database 180 may include RAM, ROM, magnetic storage devices, optical storage devices, or any other suitable information storage device or a combination of these devices. Although adaptation database 180 is shown separate from control loop 120, adaptation control loop 140, and control loop database 160 in FIG. 1B, adaptation database 180 may be located in any location suitable for communication with control loop 120, adaptation control loop 140, and control loop database 160. Adaptation database 180 may be externally located from system 100. Adaptation database 180 may be located in control loop 120, adaptation control loop 140, or control loop database 160. Although described as a database, adaptation database 180 may be implemented as any suitable type of volatile or non-volatile memory. Adaptation database 180 may include one or more interfaces and/or processor.

Although FIG. 1B illustrates a particular arrangement of network 110, control loop 120, adaptation control loop 140, control loop database 160, and adaptation database 180, this disclosure contemplates any suitable arrangement of network 110, control loop 120, adaptation control loop 140, control loop database 160, and adaptation database 180. Two or more of control loop 120, adaptation control loop 140, control loop database 160, and adaptation database 180 may be connected to each other directly, bypassing network 110. Two or more of network 110, control loop 120, adaptation control loop 140, control loop database 160, and adaptation database 180 may be physically or logically co-located with each other in whole or in part. Although FIG. 1B illustrates a particular number of networks 110, control loops 120, adaptation control loops 140, control loop databases 160, and adaptation databases 180, this disclosure contemplates any suitable number of networks 110, control loops 120, adaptation control loops 140, control loop databases 160, and adaptation databases 180.

FIG. 2 illustrates example control loop team modules 200 that may be used by the system of FIGS. 1A and 1B. Control loop team modules 200 are computer systems that may each include an interface, a memory, and a processor, which may be components of computer system 400. A control loop team is a team of multiple control loops that work together to accomplish a higher-level goal. Control loop teams can be composed of control loops with different functional categories (e.g., a performance control loop, a security control loop, and a cost minimization control loop). A control loop team may include control loop 120 and adaptation control loop 140 of system 100 (see FIGS. 1A and 1B). Control loop teams may be composed of control loops in different locations, operating at different times, operating in different network slices, and operating at different applications and/or network layers. A lower-level control loop team may be a member of a higher-level control loop team.

Control loop team modules 200 of FIG. 2 include an intercommunication module 220, a teaming module 230, a sequencing module 240, a dispute module 250, a learning module 260, a logging module 270, and a database 280 connected by a control loop team module communication bus 210. One or more control loop team modules 200 may be used by a control loop team that includes control loop 120 and adaptation control loop 140 of FIGS. 1A and 1B.

Intercommunication module 220 finds, identifies, and communicates with and between all other control loops of a control loop team. Intercommunication module 220 may find, identify, and communicate with and between control loop 120 and adaptation control loop 140 of system 100. Intercommunication module 220 may utilize intercommunication parameters (e.g., predetermined intercommunication policies) to facilitate communication between control loops of a control loop team.

Teaming module 230 makes decisions and enforces policies and constraints in accordance with the higher-level control loop team's goals and behavior. Teaming module 230 may utilize one or more parameters (e.g., predetermined teaming policies) to enforce control loop parameters (e.g., predetermined control loop policies) of one or more control loops of the control loop team. Teaming module 230 may determine that a first control loop of a control loop team (e.g., control loop 120) is a slave to a second control loop of a control loop team (e.g., adaptation control loop 140). Teaming module 230 may determine that a first control loop of a control loop team (e.g., control loop 120) is a master of all other control loops in the control loop team.

Sequencing module 240 determines the correct sequencing of actions between control loops of a control team. Sequencing module 240 may determine the correct sequencing of actions based on one or more sequencing parameters (e.g., predetermined sequencing policies). Sequencing module 240 may determine the correct sequencing of actions based on analysis of the actions and/or time-based dependencies. Sequencing module 240 may sequence an action to be taken by control loop 120 before or after an action to be taken by adaptation control loop 140.

Dispute module 250 determines an outcome when decisions between control loop team members involve conflicting aims or results. Dispute module 250 may determine an outcome based on one or more dispute parameters (e.g., predetermined dispute polices), analysis of the disputes, and/or predetermined priorities. Dispute module 250 may determine an outcome between a performance control loop and a cost control loop. A performance control loop may want to scale up due to demand considerations, whereas a cost control loop may want to limit the scale up due to cost considerations. Dispute module 250 may use dispute policies to determine whether and how much to scale up. Dispute module 250 may determine an outcome based at least in part on whether one or more control loops of the control loop team are designated as master or slave.

Learning module 260 monitors and analyzes outcomes to flag items for further analysis, learning, and/or automated learning (e.g., learning based on AI/ML techniques). Learning module 260 may monitor an outcome determined by dispute module 250 and flag the outcome for further analysis. Logging module 270 logs important items for potential troubleshooting and record keeping purposes. Logging module 270 may log one or more actions taken by one or more control loops of the control loop team. Database 280 stores data for control loop team modules 200. Database 280 may store parameters (e.g., special controlling data, code, and policies) for one or more control loop team modules 200. Database 280 may store sequencing parameters for sequencing module 240 and dispute parameters for dispute module 250. Database 280 may store decisions determined by teaming module 230.

Control loop team module communication bus 210 includes hardware, software, or both coupling two or more control loop team modules 200 to each other. Control loop team module communication bus 210 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Control loop team module communication bus may include one or more buses 210, where appropriate. Although this disclosure describes and illustrates a particular bus, this disclosure contemplates any suitable bus or interconnect.

FIG. 3 illustrates an example method for adjusting a control loop. Method 300 begins at step 310. At step 320, a control loop having an interface, a memory, and a processor monitors a first environment. The first environment may be a server of a cloud computing platform. The control loop has one or more predetermined control loop parameters. The predetermined control loop parameters may include a policy, a policy set, a code portion (e.g., a data collection code portion or a data analysis code portion), and a threshold value. The control loop may monitor the first environment in accordance with the predetermined control loop parameters.

At step 330, the control loop receives first data from the first environment. The first data may include event data or performance data of a VNF server. The one or more predetermined control loop parameters may include data collection policies, and the control loop may receive the first data in accordance with the data collection policies. The control loop may include data analysis policies, and the control loop may analyze the first data in accordance with the data analysis policies. The control loop may initiate one or more actions based on the analyzed first data. The control loop may send the predetermined control loop parameters to an adaptation control loop.

At step 340, the control loop receives information from the adaptation control loop. The control loop and the adaptation control loop may be part of a control loop team. The control loop and the adaptation control loop may be different components of a single control loop. The information received by the control loop includes recommended adjustments to the predetermined control loop parameters. The adaptation control loop may monitor a second environment based on one or more adaptation parameters (e.g., predetermined adaptation policies), collect second data (e.g., an internal operating condition) from the second environment (e.g., a virtual cloud service), analyze the second data, and determine recommended adjustments to the control loop parameters based on the analyzed second data. The adaptation control loop may then transmit the recommended adjustments to the control loop.

At step 350, the control loop determines whether to adjust one or more predetermined control loop parameters based at least in part on the information received from the adaptation control loop. The control loop may automatically determine to self-adjust its predetermined control loop parameters when recommended adjustments are received from the adaptation control loop. The control loop may decide whether to self-adjust its predetermined control loop parameters when recommended adjustments are received from the adaptation control loop. For example, the control loop may decide to adjust its control loop parameters if a teaming module (e.g., teaming module 230 of FIG. 2) decides to enforce the recommended adjustments. As another example, the control loop may decide not to adjust its control loop parameters if a dispute module (e.g., dispute module 250 of FIG. 2) prioritizes the original control loop parameters over the recommended adjustments.

If the control loop determines to adjust its predetermined control loop parameters, method 300 advances to step 350, where the control loop automatically self-adjusts its predetermined control loop parameters. Automatically adjusting the predetermined control loop parameters may include adding at least one new parameter to the one or more predetermined control loop parameters, deleting at least one of the one or more predetermined control loop parameters, or replacing at least one of the one or more predetermined control loop parameters with one or more alternate parameters. Automatically adjusting the predetermined control loop parameters may include switching policy sets (e.g., from policy set no. 1 to alternate policy set no. 8), switching policies within a set (e.g., from policy 5A in policy set no. 3 to alternate policy 5C in policy set no. 3), changing a code portion to another code portion (e.g., from subroutine/object/microservice/neural network represented by # XYZ to alternate subroutine/object/microservice/neural network represented by # ABC), or adding or dropping code portions, analysis algorithms, policies, policy sets, or actors. If the control loop determines not to adjust its predetermined control loop parameters, method 300 advances to step 390, where method 300 ends.

After automatically adjusting the predetermined control loop parameters at step 360, method 300 moves to step 370, where the control loop decides whether to initiate an action based on the first data collected from the first environment and the adjusted control loop parameters. The control loop may monitor the first environment based on the adjusted control loop parameters, collect first data from the first environment, analyze the first data, and determine whether to initiate an action based on the analyzed first data. If the control loop determines to initiate an action, method 300 moves to step 380, where the action is initiated. The initiated action may include sending a message to a management system, recommending a remedial measure, or installing a software patch to a software program associated with the first environment (e.g., installing a software patch on a VNF server). Method 300 then advances to step 390, where method 300 ends. If at step 370 the control loop decides not to initiate an action based on the first data collected from the first environment and the adjusted control loop parameters, method 300 skips step 380 and proceeds to step 390, where method 300 ends.

Modifications, additions, or omissions may be made to method 300 depicted in FIG. 3. Method 300 may include more, fewer, or other steps. Method 300 may include receiving, by an adaptation control loop, second data from a second environment. Method 300 may include monitoring, by a performance control loop, a third environment and receiving, by the performance control loop, third data associated with the third environment. Method 300 may include sequencing, by a sequencing module, actions initiated by the control loop and the performance control loop. Steps may also be performed in parallel or in any suitable order. While discussed as specific components completing the steps of method 300, any suitable component of system 100 may perform any step of method 300.

FIG. 4 illustrates an example computer system that may be used by the systems and methods described herein. For example, any of network 110, control loop 120, adaptation control loop 140, control loop database 160, adaptation control loop database 180, and control loop team modules 200 may include one or more interface(s) 410, processing circuitry 420, memory(ies) 430, and/or other suitable element(s). Interface 410 (e.g., interface 122, 142, or 162 of FIG. 1B) receives input, sends output, processes the input and/or output, and/or performs other suitable operation. Interface 410 may comprise hardware and/or software.

Processing circuitry 420 (e.g., processor 126, 146, or 166 of FIG. 1B) performs or manages the operations of the component. Processing circuitry 420 may include hardware and/or software. Examples of a processing circuitry include one or more computers, one or more microprocessors, one or more applications, etc. In certain embodiments, processing circuitry 420 executes logic (e.g., instructions) to perform actions (e.g., operations), such as generating output from input. The logic executed by processing circuitry 420 may be encoded in one or more tangible, non-transitory computer readable media (such as memory 430). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 (e.g., memory 124, 144, or 164 of FIG. 1B) may comprise one or more non-transitory, tangible, computer-readable, and/or computer-executable storage media. Examples of memory 430 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
monitoring, by a control loop comprising a processor and a memory, a first environment, wherein the control loop comprises one or more predetermined control loop parameters;
receiving, by the control loop and in response to monitoring the first environment, first data from the first environment;
receiving, by the control loop, information from an adaptation control loop, wherein the information is based on:
one or more predetermined adaptation policies of the adaptation control loop; and
second data received by the adaption control loop from a second environment;
determining, by the control loop, to automatically adjust at least one of the one or more predetermined control loop parameters based at least in part on the information received from the adaptation control loop;
automatically adjusting, by the control loop, the one or more predetermined control loop parameters; and
determining, by the control loop, to initiate an action based on the first data collected from the first environment and the one or more adjusted control loop parameters.

2. The method of claim 1, wherein the one or more predetermined control loop parameters comprise at least one of the following:
a policy;
a data collection code portion; and
a threshold value.

3. The method of claim 1, wherein automatically adjusting the one or more predetermined control loop parameters comprises one or more of the following:
adding at least one new parameter to the one or more predetermined control loop parameters;
deleting at least one of the one or more predetermined control loop parameters; and
replacing at least one of the one or more predetermined control loop parameters with one or more alternate parameters.

4. The method of claim 1, wherein:
the first environment is a virtual network function (VNF);
the first data received from the first environment comprises at least one of the following:
event data of the VNF; and
performance data of the VNF;
the second environment is a virtual cloud service for an entity; and
the second data comprises at least one of the following:
an internal operating condition of an entity;
personal information of the entity;
operating costs of the entity; and
security information of the entity.

5. The method of claim 1, wherein the information is further based on at least one of the following:
a microservice;
a neural network;
artificial intelligence; and
machine learning.

6. The method of claim 1, wherein the control loop comprises the adaptation control loop.

7. The method of claim 1, wherein the control loop is a slave to the adaptation control loop.

8. The method of claim 1, wherein the action comprises one or more of the following:
sending a message to a management system;
recommending a remedial measure; and
installing a software patch to a software program associated with the first environment.

9. One or more computer-readable non-transitory storage media embodying software that is executable to:
monitor, by a control loop comprising a processor and a memory, a first environment, wherein the control loop comprises one or more predetermined control loop parameters;
receive, by the control loop and in response to monitoring the first environment, first data from the first environment;
receive, by the control loop, information from an adaptation control loop, wherein the information is based on:
one or more predetermined adaptation policies of the adaptation control loop; and
second data received by the adaption control loop from a second environment;
determine, by the control loop, to automatically adjust at least one of the one or more predetermined control loop parameters based at least in part on the information received from the adaptation control loop;
automatically adjust, by the control loop, the one or more predetermined control loop parameters; and
determine, by the control loop, to initiate an action based on the first data collected from the first environment and the one or more adjusted control loop parameters.

10. The media of claim 9, wherein the one or more predetermined control loop parameters comprise at least one of the following:
a policy;
a data collection code portion; and
a threshold value.

11. The media of claim 9, wherein automatically adjusting the one or more predetermined control loop parameters comprises one or more of the following:
adding at least one new parameter to the one or more predetermined control loop parameters;
deleting at least one of the one or more predetermined control loop parameters; and
replacing at least one of the one or more predetermined control loop parameters with one or more alternate parameters.

12. The media of claim 9, wherein:
the first environment is a virtual network function (VNF);
the first data received from the first environment comprises at least one of the following:
event data of the VNF; and
performance data of the VNF;
the second environment is a virtual cloud service for an entity; and
the second data comprises at least one of the following:
an internal operating condition of an entity;
personal information of the entity;
operating costs of the entity; and
security information of the entity.

13. The media of claim 9, wherein the information is further based on at least one of the following:
a microservice;
a neural network;
artificial intelligence; and
machine learning.

14. The media of claim 9, wherein the control loop comprises the adaptation control loop.

15. The media of claim 9, wherein the control loop is a slave to the adaptation control loop.

16. The media of claim 9, wherein the action comprises one or more of the following:
  sending a message to a management system;
  recommending a remedial measure; and
  installing a software patch to a software program associated with the first environment.

17. A system comprising one or more processors and a memory coupled to the processors comprising instructions executable by the processors to:
  monitor, by a control loop, a first environment, wherein the control loop comprises one or more predetermined control loop parameters;
  receive, by the control loop and in response to monitoring the first environment, first data from the first environment;
  receive, by the control loop, information from an adaptation control loop, wherein the information is based on:
    one or more predetermined adaptation policies of the adaptation control loop; and
    second data received by the adaption control loop from a second environment;
  determine, by the control loop, to automatically adjust at least one of the one or more predetermined control loop parameters based at least in part on the information received from the adaptation control loop;
  automatically adjust, by the control loop, the one or more predetermined control loop parameters; and
  determine, by the control loop, to initiate an action based on the first data collected from the first environment and the one or more adjusted control loop parameters.

18. The system of claim 17, wherein the one or more predetermined control loop parameters comprise at least one of the following:
  a policy;
  a data collection code portion; and
  a threshold value.

19. The system of claim 17, wherein automatically adjusting the one or more predetermined control loop parameters comprises one or more of the following:
  adding at least one new parameter to the one or more predetermined control loop parameters;
  deleting at least one of the one or more predetermined control loop parameters; and
  replacing at least one of the one or more predetermined control loop parameters with one or more alternate parameters.

20. The system of claim 17, wherein:
the first environment is a virtual network function (VNF);
the first data received from the first environment comprises at least one of the following:
  event data of the VNF; and
  performance data of the VNF;
the second environment is a virtual cloud service for an entity; and
the second data comprises at least one of the following:
  an internal operating condition of an entity;
  personal information of the entity;
  operating costs of the entity; and
  security information of the entity.

* * * * *